United States Patent Office 3,756,786
Patented Sept. 4, 1973

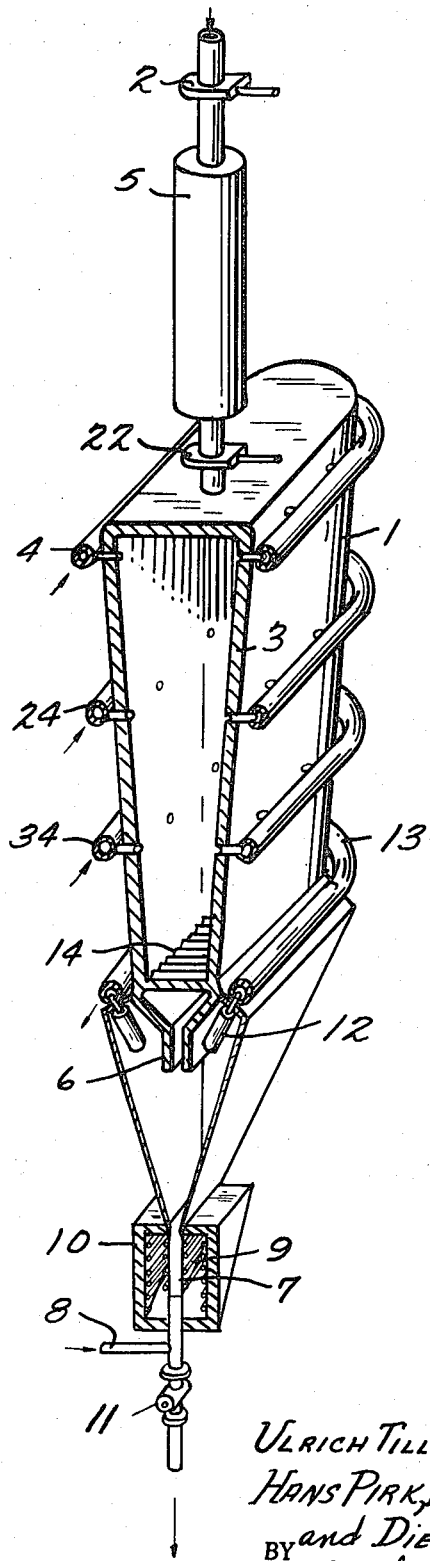

3,756,786
PROCESS AND APPARATUS FOR THE RECOVERY OF NUCLEAR FUEL MATERIAL FROM FUEL ELEMENTS OF GRAPHITE MODERATED HIGH TEMPERATURE REACTORS
Ulrich Tillessen, Grossauheim, Karl-Heinz Engel, Hanau am Main, Hans Pirk, Dornigheim, Karl-Gerhard Hackstein, Hanau am Main, and Dietger Habermann, Bremen, Germany, assignors to Nuken, Nuklear-Chemie und- Metallurgie Gesellschaft mbH, Wolfgang bei Hanau am Main, Germany
Filed Nov. 30, 1970, Ser. No. 93,535
Claims priority, application Germany, Dec. 5, 1969,
P 19 61 145.1
Int. Cl. C01g 56/00
U.S. Cl. 423—4    11 Claims

ABSTRACT OF THE DISCLOSURE

Nuclear fuel elements containing a graphite moderator are reworked by burning the unground fuel element carbon in a two step fixed bed process with oxygen. The structural and matrix graphite are burned in a first step at 800° C. to 1100° C., and the pyrolytic carbon is burned in a second step at a lower temperature of 600° C. to 900° C. There is also disclosed a shaft furnace for performing the process.

---

The invention is concerned with a new shaft furnace process for burning the fuel element graphite used in gas-cooled high temperature reactors as moderator as well as structural and coating materials.

The fuel elements in nuclear reactors of this type mostly consist of graphite molded bodies, into which the nuclear fuel material as coated particles is firmly embedded or brought by loose pouring. The coated particles contain spherical kernels of the actual fuel material having a diameter of about 400 $\mu$m. These kernels are gas tightly coated by a pyrolytic carbon layer of about 100 $\mu$m. thickness. The coating and embedding of the kernels into a graphite matrix prevent the release of fission products into the cooling cycle of the reactor.

Fuel elements of this type have been proven in reactor operation. The processing of production waste and especially of fuel elements burned in the reactor, however, presents a difficult problem. First of all, about 99% of the fuel element volume present as moderator and structural graphite have to be removed in order to expose the fuel material for the chemical reprocesing.

All the numerous variants proposed in this connection, as the electrolytic disintegration of the graphite, the wet chemical or dry chemical extraction of ground fuel elements, have the same disadvantage that all the graphite of irradiated fuel elements remains as highly radioactive powdered waste.

Therefore, the proposal has been made to burn the graphite in a stream of pure oxygen, so that the nuclear fuel material is recovered as carbon free ash, and to discharge the carbon as inactive gaseous carbon dioxide into the atmosphere after an intensive purification from volatile fission products. In this connection, at first special attention has been paid to the fixed bed process. Its special advantage, compared with the fluidized bed process, is that an expensive grinding and screening of the fuel elements is eliminated. The graphite elements can directly be fed into the furnace without any previous treatment or perhaps after rough crushing depending on their size. A shaft furnace according to the fixed bed reactor principle offers as a further advantage that nearly all the graphite can continuously be burned in one step due to the uniform residence time.

The disadvantage of the shaft furnace principle is primarily to be seen in the low material and heat transfer in the fixed bed.

The low material and heat transfer in a coarse particle fixed bed for performing gas/solid material reactions requires long residence times and, consequently, large container volumes. This disadvantage adds up to that of the difficulties connected with the heat removal.

Thus far, when employing pure oxygen, the heat could not contrallably be removed from the furnace so that local overheating and sinteirng of the heavy metal ash could not be avoided. In addition, large container volumes cause criticality problems. This fact has contributed to the early cease of the shaft furnace development in favor of the fluidized bed reactor.

This invention presents a further development of the known shaft furnace process. It aims at the removal of the described disadvantages which could not be avoided in the previous process. One of its aims is the operation of the process at moderately high temperatures of not more than 1100° C. in order to exclude sintering of the nuclear fuel material and an extended vaporization of fission products.

Extensive investigations on the reaction kinetics of graphite and pyrolytic carbon with different gaseous reactants have preceded the invention. The conclusion according to these experiments can be summarized as follows:

(a) The combustion rate of pyrolytic carbon and matrix graphite is very different. When burning graphite with pure oxygen at temperatures of about 900° C., a technically reasonable combustion rate in the order of about 1 gram carbon/cm.$^2$×hours, relative to the geometric surface, is attained, whereas the outer, hard particle coatings are very resistant to combustion and reach only 10% of this rate. Therefore, the process of combustion in the shaft furnace provides the separation of the pyrolytic carbon coated fuel particles from the graphite matrix and their removal as "granulated" ash. It is, therefore, technically effective for the process to conduct a two step continuous combustion until the kernels are completely exposed.

(b) For reaction kinetic reasons, gasification of carbon by means of carbon dioxide or steam is not possible for graphite. In comparison with the speed of the combustion reaction, the speed of the Boudouard and steam reactions is so low that it is not yet of importance below 1000° C. If therefore carbon dioxide or steam is added to the oxygen as cooling agent, below 1000° C. the cooling effect is of physical, but not of chemical nature.

(c) The graphite combustion rate is proportional to the oxygen partial pressure. The furnace throughout is therefore considerably reduced by the oxygen dilution. The optimum oxygen concentration is determined by the maximum allowable combustion temperature.

(d) An increase of the CO-concentration in the waste gas in consequence of the raise of temperature is observed in the combustion with pure oxygen or gaseous mixtures containing $O_2$. Since a conversion according to the Boudouard and steam reactions does not take place, the generation of CO is due to an incomplete conversion of the graphite.

There has now been invented a continuous two step process according to which, considering the above stated knowledge, for the first time nearly all the fuel element graphite can be burned in only one fixed bed with high throughput, and the reaction can be controlled in a way that maximum temperatures of more than 1100° C. are avoided. In fact, temperatures as low as 700° C. can be applied; preferably the temperature should be between 800° C. and 1000° C. The pyrolytic carbon is burned in a second fixed bed at 600° C.–900° C., together with unburned residues of the matrix and structural graphite of the first process step, and the absolutely carbon free particle kernels are removed from the two step apparatus constructed as an integrated unit.

By appropriate dimensioning of the furnace, a considerable portion of the reaction heat set free in the upper furnace can be removed by a cooled furnace wall. For this purpose, as much cooling surface as possible has to be offered to the graphite charge. Therefore, the process according to the invention is preferably performed in a furnace with rectangular profile. The rectangularly profiled furnace offers the additional advantage that the throughput can be increased as desired by enlarging the furnace in its longitudinal direction while all other dimensions are retained; this measure does not influence the combustion ratio in the charge.

Furthermore, the guarantee of nuclear safety of the process is facilitated by the rectangular furnace construction, since the neutron leakage of the nuclear fuel arrangement is thus increased sufficiently. The furnace corners advisably are rounded in order to prevent dead zones during the combustion process. The cooling of the furnace wall is effected by an appropriate medium, preferably water. In order to guarantee nuclear safety under controlled moderation conditions, the possibility of water penetration must be excluded by providing a suction cooling device, or a neutron poison must be added to the cooling water.

These measures do not yet suffice to maintain the heat balance of a shaft furnace with high throughput. Therefore a considerable reaction heat portion is removed through direct cooling by means of an appropriate gaseous cooling medium. The process according to the invention employs gases with relatively high heat capacity, for instance nitrogen, carbon dioxide or steam.

As experiments have shown, the oxygen cannot entirely be used up in a water cooled shaft furnace due to the fact that it moves along the walls, and the carbon monoxide nearly entirely burns off with surplus oxygen within the cooler zones of the charge near the shaft walls. Thus, the unavoidable $O_2$ excess effects an advantage, as it reliably prevents the formation of explosive gaseous mixtures.

In the recovery of irradiated nuclear fuel material extensive measures have to be taken for purification of the offgas in order to remove radioactive dusts and aerosols as well as gaseous fission products, such as radioactive iodine, tritium, and fission rare gases. Considering the high costs for the shielded hot cell volume, the gas purification facilities should be installed on as small an area as possible. It is, therefore, desirable to keep the offgas volume as small as possible. The process according to the invention can meet this demand by using preferably carbon dioxide as the cooling agent, which is available in the offgas in sufficient quantities and can be recycled. In this very simple manner the offgas quantity can be reduced to its theoretical minimum by just pumping off only as much waste gas as fresh oxygen is fed into the system.

Contrary to the usual method of shaft furnace processes working with counter-current flow, according to the invention the reaction gas in the upper furnace is passed vertically from about downwardly through the charge in the falling direction of the particle ash. This method presents, on the one hand, the advantage that a clogging of the charge by graphite dust or particles is safely prevented. On the other hand, the filled furnace can easily be ignited from above downwardly by adding a small number of fuel elements electrically heated outside the furnace.

For effecting a most uniform reaction rate over the entire height of the charge, the reaction gas is fed into several zones lying one above the other. The increasing enrichment of the reaction gas mixture by oxygen from above downwardly has proven to be practicable in order to avoid dilution with offgas of the upper zones and, thereby, a reduction of the reaction rate is prevented as far as possible. The required oxygen enrichment as well as the oxygen supply, however, are limited by the maximum temperature of 1100° C. aimed at within the lower zones. The special shaping of the furnace, which at its front side narrows downwardly, effects uniform falling speed in all parts of the charge in spite of the reduced volume throughput in the lower portion. The offgas of the upper furnace together with nuclear fuel particles and graphite dust is removed from the charge through the grill and so deflected that the solid material is discharged into the second furnace arranged below by the centrifugal force.

The second furnace operates according to the principle of the fixed bed, which, however, in the present case is flowed through from below upwardly by pure oxygen or highly enriched oxygen mixtures. For better removal of combustion and radioactive decay heat, the second furnace chamber is constructed as a narrow rectangular or annular shaft. The heat is discharged through the wall to a cooling register so that the inside temperature is not reduced below the graphite ignition temperature of 550° C. The chamber is electrically heated from the outside in order to produce this temperature at the starting state of the process.

The offgas of the lower furnace together with the offgas stream of the upper furnace is cooled to 300° C. and removed by a filter device integrated with the process apparatus. A cooling temperature of 25° C. to 40° C. can be applied. Porous sintered metals are employed as filters and arranged so that the adhering dust is to be blown off by a blow back gas stream and discharged into the second furnace chamber.

Prior to their purification from radioactive aerosols and gases in end stage absorbers, the gases are then cooled below 100° C. in a cooler. A reduced pressure of 30 mm. to 100 mm. of water is maintained in the entire apparatus to prevent contamination of the surrounding cell. The attached drawing shows an apparatus according to the invention in plan view, partially broken away.

In the following, the process and apparatus according to the invention are further explained by the example of a reprocessing facility for high temperature spheric elements and by referring to the attached drawing.

EXAMPLE 1

The apparatus is constructed for a throughput of 60 fuel elements per hour so that the fuel elements of a 600 electric megawatt pebble bed reactor can be reprocessed. One fuel element with a diameter of 60 mm. weighs 200 grams, of which 10 grams are nuclear fuel material and fission products, and 190 grams carbon.

After a certain decay time, the fuel elements are continuously taken from a depot and fed into the shaft furnace 1 through the charging valves 2 and 22. For criticality reasons and for better heat removal, the furnace has a rectangular profile. The furnace is 700 mm. long.

Seen from its front side, the furnace narrows from above downwardly. At 1000 mm. above the water cooled grill 14 the interior furnace width is 300 mm.; the grill width is 150 mm. The shaft is provided with a cooling jacket 3 and is intensively water cooled from the outside.

The shaft width, the oxygen supply as well as the inert gas ballast are so balanced that sufficient heat is removed and the temperature of 700° C. to 1000° C., e.g. 900° C., is uniformly distributed over the charge. The carbon dioxide recycled from the offgas as cooling agent is enriched with oxygen and fed into three zones above the charge heights through the annular conduits 4, 24, and 34.

As Table I shows, the $O_2$ supply is so graduated in the different zones that the carbon reaction with oxygen, in relation to the profile surface, is nearly constant on all charge levels. The cooling gas ballast is adjusted to the reaction heat per volume unit which decreases downwardly from one zone to the other. The table is based on experiments which showed that the oxygen is utilized to an extent of 90% only and the CO portion is negligibly low due to the high $O_2$ excess.

Ignition is effected by adding pebbles preheated in an electric pipe furnace 5 outside the charge. The offgas of the upper furnace is deflected around the chute 6 arranged beneath the grill, so that the heavy metal ash and the residual carbon are thus discharged into the second furnace 7 arranged beneath. The second furnace is constructed as a narrow chamber of rectangular profile (250 mm. high and 40 mm. wide), which, seen from its longitudinal side, tapers downwardly in an angle of 90°.

The combustion is effected by pure oxygen fed through the socket 8 at low temperatures between 600° C. and 900° C., e.g. 750° C., so that an emission of volatile fission products is avoided as far as possible. The cooling is effected by tempered compressed air through the cooling register 9 welded upon the container.

At the starting state, the container is heated up to its ignition temperature of 550° C. from the outside by the electric radiator 10, feeding heat through the cooling register. The electric radiator is thermically insulated to the outside.

The amount of particles burned as well as their residence time in the second furnace chamber are adjusted by the frequency of the discontinuously operating discharge device 11.

The offgases of the lower and upper chambers are assembled and removed by a filter unit integrated with the entire apparatus. The filter unit consists of twelve sintered metal filter candles 12. These filter candles are arranged laterally above the second furnace chamber hanging in inclined arrangement from above downwardly. The gas is discharged from the filters by the annular conduit 13 at 300° C. and cooled below 100° C. outside the furnace prior to its fine filtration. One offgas portion is recycled into the apparatus by a compressor. The remaining offgas portion is discharged into the atmosphere by an exhauster through a chimney. The exhauster maintains reduced pressure of at least 30 mm. of water within the apparatus, relative to the pressure in the surrounding cell.

EXAMPLE 2

The process described in the following differs from that described in Example 1 just in the fact that the combustion is effected by $O_2$ enriched air.

Special advantages of this method are the saving of oxygen and the prevention of an offgas recirculation. The increase of the offgas amount, however, presents a disadvantage with respect to the filter dimensions.

Due to the low specific heat of nitrogen, the employment of nitrogen as cooling agent instead of carbon dioxide influences the heat balance in the furnace. For operating the furnace at the same capacity and temperature the gas mixture must be altered. Table I shows that the total offgas amount increases by 17% of the offgas total in Example 1, provided an $O_2$ utilization of 90% is obtained.

The gas is discharged from the filters at 300° C. and cooled below 100° C. outside the furnace prior to its fine filtration. An exhauster maintaining an reduced pressure of at least 30 mm. of water within the apparatus, relative to the pressure in the surrounding cell, discharges the offgas into the atmosphere through a chimney.

TABLE I

| Example | Zone | Reaction rate (balls/hr.) | Cross section (balls/m.² h.) | Volume reaction rate (balls/m.³ h.) | $O_2$ enrichment (percent) | Amount of gas (Nm.³/h.) | | |
|---|---|---|---|---|---|---|---|---|
| | | | | | | $O_2$ | $CO_2$ | Total |
| 1 | 1 | 28 | 160 | 424 | 35 | 9.4 | 18.4 | 27.8 |
| | 2 | 19 | 160 | 365 | 41 | 6.4 | 9.2 | 15.6 |
| | 3 | 13 | 160 | 290 | 51 | 4.3 | 4.2 | 8.5 |
| | | | | | | 20.1 | 31.8 | 51.9 |
| 2 | 1 | 28 | 160 | 424 | 29 | 9.4 | 23.0 | 32.4 |
| | 2 | 19 | 160 | 365 | 36 | 6.4 | 11.5 | 17.9 |
| | 3 | 13 | 160 | 290 | 45 | 4.3 | 5.3 | 9.6 |
| | | | | | | 20.1 | 39.8 | 59.9 |

What is claimed is:

1. Process for reprocessing of nuclear fuel material from irradiated or non irradiated fuel elements of graphite moderated high temperature reactors, characterized in burning unground fuel element carbon with oxygen in a two step fixed bed process, (1) burning the structural and matrix graphite in a first step at temperatures of 800° C. to 1100° C. in a cooled shaft furnace with a mixture of oxygen and a gaseous cooling agent concurrently flowing through the charge from above downwardly, and (2) burning the nuclear fuel particles discharged through the cooled grill and still coated with pyrolytic carbon at temperatures of 600° C. to 900° C. in a second fixed bed with oxygen flowing countercurrently through the charge from downwards to the above, and discharging the nuclear fuel elements substantially free of carbon continuously or batchwise.

2. Process according to claim 1, wherein the gaseous cooling agent is steam, nitrogen or carbon dioxide.

3. Process according to claim 2, wherein there is employed carbon dioxide as cooling agent taken from the offgas by compressing and recycling it to the first process step.

4. Process according to claim 3, wherein the reaction gas mixture is fed into the first step of combustion in several zones over the charge height, and the reaction gas mixture fed in is increasingly enriched from above downwardly with oxygen up to oxygen volume percentages of 30% to 60%.

5. Process according to claim 1, wherein the oxygen in the second step is substantially pure and flows countercurrently through the charge.

6. Process according to claim 2, wherein the offgases from both combustion steps flow together and are cooled, cleaned from dusts and aerosols in two steps, first by a preliminary purification after cooling to a temperature below 300° C., and then by a fine purification after further cooling to a temperature below 100° C.

7. Process according to claim 1, wherein the purified offgases are discharged into the atmosphere, and an exhauster maintains low pressure of at least 30 mm. of water below the surrounding building atmosphere within the combustion and gas purification devices.

8. Shaft furnace suitable for reprocessing nuclear fuel materials by burning carbon contained therein, said shaft furnace standing vertically, being of elongated rectangular cross section and having rounded corners, said furnace tapering from top to bottom, said shaft furnace having means for introducing oxygen containing gas, external means for electrically preheating the carbon fed, means to charge the fuel material to the top of said furnace, external fluid suction cooling means, perforated solid support means near the bottom of the furnace, filtering means situated below said support means for separating solids and aerosols from offgases, and means for removing the thus purified offgases.

9. Apparatus according to claim 8, wherein said filtering means are laterally arranged filtering candles slanting downwardly.

10. Apparatus according to claim 8, comprising a second furnace operatively connected to, integral with, and arranged below said shaft furnace, of slab or annular cross section, said second furnace provided with cooling means and external electric radiation heating means, means for introducing solid discharge from said shaft furnace to the top of said second furnace, means for supplying reaction gas to the bottom of said second furnace, and means for discharging solids from the bottom of the second furnace.

11. Process according to claim 1 wherein the reaction gas mixture is fed into the first step of combustion in several zones over the charge height, and the reaction gas mixture fed is increasingly enriched from above downwardly with oxygen up to oxygen volume percentages of 30% to 60%.

References Cited

FOREIGN PATENTS 1,114,664  5/1968  Great Britain _____ 23—324

OTHER REFERENCES

Nuclear Science Abstracts, Vol. 24, #29364, Aug. 15, 1970, Abstract of ORNL–tr–2302.

Nuclear Science Abstracts, Vol. 24, #27190, July 15, 1970, Abstract of ORNL–tr–2303.

CARL D. QUARFORTH, Primary Examiner

R. E. SCHAFER, Assistant Examiner

U.S. Cl. X.R.

23—277